United States Patent
Schroeder

(10) Patent No.: US 9,973,946 B2
(45) Date of Patent: May 15, 2018

(54) PROTECTING A MOBILE COMMUNICATION NETWORK FROM PERFORMANCE IMPACTS

(71) Applicant: Deutsche Telekom AG, Bonn (DE)

(72) Inventor: Stefan Schroeder, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 63 days.

(21) Appl. No.: 15/303,738

(22) PCT Filed: Mar. 26, 2015

(86) PCT No.: PCT/EP2015/056659
§ 371 (c)(1),
(2) Date: Oct. 13, 2016

(87) PCT Pub. No.: WO2015/158524
PCT Pub. Date: Oct. 22, 2015

(65) Prior Publication Data
US 2017/0034719 A1    Feb. 2, 2017

(30) Foreign Application Priority Data
Apr. 16, 2014    (EP) .................................. 14165012

(51) Int. Cl.
*H04B 7/00* (2006.01)
*H04W 24/04* (2009.01)
(Continued)

(52) U.S. Cl.
CPC ............. *H04W 24/04* (2013.01); *H04L 43/16* (2013.01); *H04L 47/32* (2013.01);
(Continued)

(58) Field of Classification Search
CPC ............. H04W 72/04; H04W 72/0413; H04W 72/048; H04W 72/0486; H04W 72/121;
(Continued)

(56) References Cited

U.S. PATENT DOCUMENTS 7,693,555 B2 * 4/2010 Srinivasan ........ H04W 52/0216
455/574
8,379,557 B2 * 2/2013 Sung ................. H04W 52/0216
370/311
(Continued)

FOREIGN PATENT DOCUMENTS

WO    WO 2012053841 A2    4/2012

OTHER PUBLICATIONS

Xuili Wang: "Mitigation of DDoS Attacks through Pushback and Resource Regulation", Multimedia and Information Technology, 2008. MMIT '08. International Conference on, IEEE, Piscataway ,NJ, USA, Dec. 30, 2008 (Dec. 30, 2008), pp. 225-228, XP021476978.
(Continued)

*Primary Examiner* — Dmitry H Levitan
(74) *Attorney, Agent, or Firm* — Leydig, Voit & Mayer, Ltd.

(57) ABSTRACT

A method for protecting a mobile communication network from performance impacts includes determining whether to apply a forwarding functionality or an alternative treatment functionality for downlink data packets directed to the specific IP-address or to the specific range of IP-addresses of the user equipment, wherein the application of the forwarding functionality versus the alternative treatment functionality of the filter element is based on load conditions of the mobile communication network at a reception time of the downlink data packets at the core network; and providing the forwarding functionality or the alternative treatment
(Continued)

functionality for the downlink data packets directed to the specific IP-address or to the specific range of IP-addresses of the user equipment.

6 Claims, 1 Drawing Sheet

(51) Int. Cl.
*H04L 12/26* (2006.01)
*H04L 12/823* (2013.01)
*H04L 29/12* (2006.01)
*H04W 72/04* (2009.01)
*H04W 88/02* (2009.01)
*H04W 88/08* (2009.01)

(52) U.S. Cl.
CPC ..... *H04L 61/2007* (2013.01); *H04W 72/0446* (2013.01); *H04W 88/02* (2013.01); *H04W 88/08* (2013.01)

(58) Field of Classification Search
CPC ......... H04W 72/1252; H04W 72/1273; H04W 72/1284
See application file for complete search history.

(56) References Cited

U.S. PATENT DOCUMENTS

| | | | | |
|---|---|---|---|---|
| 9,204,415 | B2* | 12/2015 | Ng | .......................... H04W 4/005 |
| 9,572,129 | B2* | 2/2017 | Ma | ..................... H04W 52/0216 |
| 2006/0052137 | A1 | 3/2006 | Randall et al. | |
| 2015/0201400 | A1* | 7/2015 | Yin | ........................ H04W 68/02 |
| | | | | 370/329 |

OTHER PUBLICATIONS

Tao Peng et al: "Protection from distributed denial of service attacks using history-based ip filtering" New Frontiers I Ntelecommunications : 2003 IEEE International Conference on Communcations ; ICC 2003 ; May 11-15, 2003 ,Anchorage, Alaska, USA ; [IEEE International Conference on Communications], IEEE Operations Center, Piscataway, NJ, vol. 1, May 11, 2003 (May 11, 2003), pp. 482-486, XP010642796.

* cited by examiner

PROTECTING A MOBILE COMMUNICATION NETWORK FROM PERFORMANCE IMPACTS

CROSS-REFERENCE TO RELATED APPLICATIONS

This application is a U.S. National Phase application under 35 U.S.C. § 371 of International Application No. PCT/EP2015/056659, filed on Mar. 26, 2015, and claims benefit to European Patent Application No. EP 14165012.7, filed on Apr. 16, 2014. The International Application was published in English on Oct. 22, 2015 as WO 2015/158524 A1 under PCT Article 21(2).

FIELD

The present invention relates inter alia to a method for protecting a mobile communication network from performance impacts, the mobile communication network comprising an access network and a core network, and the core network comprising a filter element such that downlink data packets are filtered by the filter element.

Furthermore, the present invention relates to a mobile communication network enabled for protecting the mobile communication network from performance impacts, the mobile communication network comprising an access network and a core network, and the core network comprising a filter element such that downlink data packets are filtered by the filter element.

Additionally, the present invention relates to a filter element for protecting the mobile communication network from performance impacts, the mobile communication network comprising an access network and a core network, and the core network comprising a filter element such that downlink data packets are filtered by the filter element.

Furthermore, the present invention relates to a program comprising a computer readable program code and a computer program product comprising a computer program which, when executed on a computer and/or on a network node of a mobile communication network, especially a filter element of a mobile communication network, causes the computer and/or the network node of the mobile communication network to perform the inventive method.

BACKGROUND

From a user perspective, mobile communication networks seem to simply provide an Internet Protocol (IP) connectivity between a user's mobile device (or user equipment) and other systems or networks, e.g. the Internet, i.e. network nodes or network structures outside of the mobile communication network in question.

However and especially within mobile communication networks, complex signaling procedures are run inside such networks as well as between the mobile communication network and a corresponding mobile device (or user equipment), in order to establish, maintain, and/or re-establish the end-to-end IP connection.

Real mobile communication networks are limited in their capacity to run many such procedures in parallel, these limitations being typically caused by processing or memory limits in network elements, and by limits in transmission capability or transmission capacity.

Capacity limits in fixed networks, such as telecommunications networks providing fixed subscriber lines, are typically measured in their capability or capacity to process (a certain number of) packets per second and/or data bandwidth in bits/s.

Mobile communication networks, i.e. telecommunications networks serving mobile subscribers or mobile communication networks, also have such limits, but they have typically even more limits, due to their higher internal complexity. Such mobile communication networks can already reach their limits and get overloaded when the value of total (number of) user packets per second or bits/s are far below the average that the network was designed to transport. This overload happens when few user packets (especially incoming data packets) result—within the internal treatment of such incoming data packets—in many signalling messages, which are sent both between different network elements, and between mobile devices and the network. Tens or even hundreds of such signalling packets may be caused by one single user packet, especially an incoming user packet.

Such traffic amplification is typically related to procedures that change the state (of activation or of activity) of a mobile device (or user equipment), e.g. when a radio (power) state changes (i.e. from idle state (or a more idle state) of the user equipment to the activated state (or a more activated state) of the user equipment), or a new traffic channel is allocated. Another typical cause for message amplification is the paging procedure, which a mobile network uses to search for a mobile device in a larger area.

Particular user traffic conditions or patterns can cause a mobile network to reach one of its many, often unknown, limits, e.g. in one of its network elements, far before the expected overall user traffic capacity is reached. When such limits are reached, parts of the network are overloaded and many customers will experience service degradation, up to loss of connectivity, even if their own traffic does not significantly contribute to the problem. With mobile networks connected to the Internet, anyone in the Internet can send traffic towards devices in the mobile network. If this traffic matches specific characteristics, it will cause a Denial-of-Service (DoS) attack against the network—regardless of whether the traffic was sent with benign or malicious intent.

Presently existing filter solutions lack awareness of mobile network specific conditions that lead to traffic amplification in the network. It depends on the state of a mobile device, if an incoming packet from the Internet targeted towards that mobile device leads to traffic amplification. Amplification will happen if the incoming packet leads to a state change. The state of the mobile device has many dimensions (power, radio, connection, physical location, logical location, radio network technology . . . ) and is neither simple to evaluate by, nor available to, a typical filter solution presently known.

Existing solutions to protect networks from overload and attacks are typically implemented as filter devices that analyze traffic according to certain criteria, such as:
source addresses,
destination addresses,
traffic contents (both in single packets, and associated traffic flows on top of IP),
traffic volume (packets/s or bits/s).
Depending on the analysis, traffic may be blocked in order to protect the network. While these criteria may be sufficient to prevent overload and attacks that may also occur in fixed networks, they are not suitable to describe traffic patterns that specifically cause overload in mobile communication networks. In particular, specific DoS and DDoS (Denial-of-Service and Distributed Denial-of-Service) protection features in existing firewall products typically aim at protecting the end hosts that are the target of such malicious traffic, rather than protecting a mobile communication network that may lie in the path of such traffic.

On the other hand, simply setting rate limits of packets/s or bits/s to the minimum that avoids every type of overload in a mobile network, however, will render the whole network useless for its purpose: it would also limit regular traffic too much, even if it does not cause network-internal amplification.

Therefore, as a precautionary approach (in order to prevent the mobile communication network from an overload situation), it needs to be assumed that—for a particular data packet to be transmitted to the mobile device or user equipment—the particular data packet will actually create additional network load, especially by means of message amplification. As a consequence, based on a given network performance (of given network structures), the number of data packets that will be handled in reality by a mobile communication network is strongly limited, and especially, it is limited (for reasons of precaution) in situations where such limitation would not be necessary to apply—i.e. the network capacity would not be exceeded by handling of the particular data packet —, because, e.g., the particular user equipment addressed is in a completely activated state or a less inactive state (compared to the idle state), and hence transmission or forwarding of the particular data packet would involve less message amplification (or no message amplification at all) within the mobile communication network compared to the particular user equipment being in idle state.

SUMMARY

In an embodiment, the present invention provides a method for protecting a mobile communication network from performance impacts, wherein the mobile communication network comprises an access network and a core network, the access network comprising a plurality of radio cells and a plurality of base station entities, and the core network comprising a plurality of network nodes of the mobile communication network, wherein a user equipment is located in a radio cell of the plurality of radio cells, the radio cell being served by a base station entity of the plurality of base station entities, wherein the user equipment is able to be either in an idle state or in an activated state, wherein the user equipment is represented by a specific IP-address or a specific range of IP-addresses, wherein the core network comprises a filter element, wherein the method comprises: determining, by the filter element, whether to apply a forwarding functionality or an alternative treatment functionality for downlink data packets directed to the specific IP-address or to the specific range of IP-addresses of the user equipment, wherein the application of the forwarding functionality versus the alternative treatment functionality of the filter element is based on load conditions of the mobile communication network at a reception time of the downlink data packets at the core network; and providing the forwarding functionality or the alternative treatment functionality for the downlink data packets directed to the specific IP-address or to the specific range of IP-addresses of the user equipment. At a given load condition of the mobile communication network, the forwarding functionality is applied for a particular downlink data packet if at least one of the following conditions are met: the filter element comprises information that the user equipment is in the activated state; a preceding downlink data packet, preceding the particular downlink data packet in time and being directed to the specific IP-address or to the specific range of IP-addresses of the user equipment, has been forwarded to the user equipment, wherein the preceding downlink data packet precedes the particular downlink data packet by less than a predetermined first time interval; a preceding uplink data packet, preceding the particular downlink data packet in time and originating from the specific IP-address or from the specific range of IP-addresses of the user equipment, has been received, by the filter element, from the user equipment, wherein the preceding uplink data packet precedes the particular downlink data packet by less than a predetermined second time interval. At the given load condition of the mobile communication network, the alternative treatment functionality is applied for a particular downlink data packet if none of the foregoing conditions are met.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
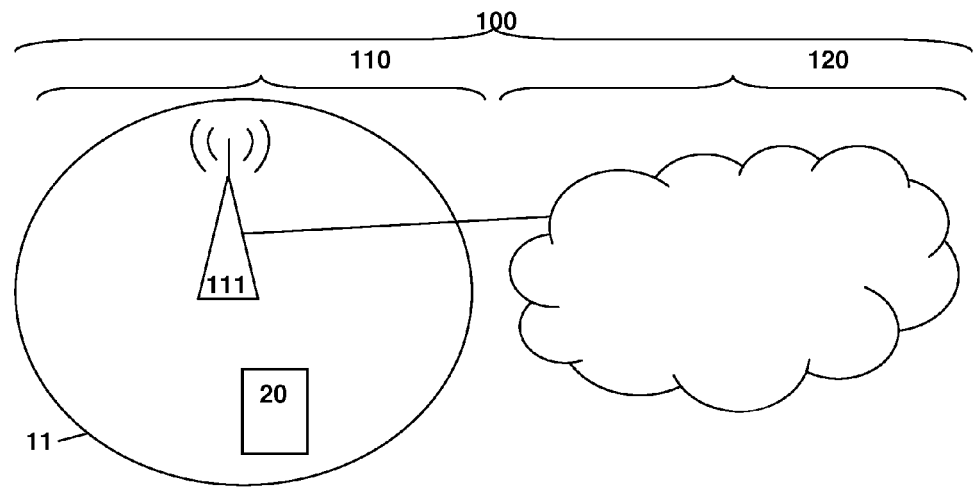
FIG. 1 schematically illustrates a conventional telecommunications network comprising an access network and a core network, as well as a user equipment as a mobile device.

In an embodiment, the present invention provides a method for protecting a mobile communication network from performance impacts, and nevertheless realize an enhanced resulting network capacity (in terms of quality of service in given situations, especially of high network load) based on given network structures of the mobile communication network, thus reducing the needs of upgrading network structures at a given level of quality of service hence reducing investment costs.

In an embodiment, the present invention provides a method for protecting a mobile communication network from performance impacts, wherein the mobile communication network comprises an access network and a core network, the access network comprising a plurality of radio cells and a plurality of base station entities, and the core network comprising a plurality of network nodes of the mobile communication network, wherein a user equipment is located in a radio cell of the plurality of radio cells, the radio cell being served by a base station entity of the plurality of base station entities, wherein the user equipment is able to be either in an idle state or in an activated state, wherein downlink data packets are transmitted from the mobile communication network to the user equipment as their destination, the downlink data packets being transported involving at least one network node of the core network and at least the base station entity, wherein uplink data packets are transmitted from the user equipment as their source to the mobile communication network, the uplink data packets being transported involving at least the base station entity and at least one network node of the core network, wherein the user equipment—as the destination of the downlink data packet and as the source of the uplink data packets—is represented by a specific IP-address or a specific range of IP-addresses, wherein the core network comprises a filter element, the filter element either providing a forwarding functionality, to the user equipment, of downlink data packets directed to the specific IP-address or to the specific range of IP-addresses of the user equipment, or providing an alternative treatment functionality of downlink data packets directed to the specific IP-address or to the specific range of IP-addresses of the user equipment, the application of the forwarding versus the alternative treatment functionality of the filter element being dependent on load conditions of the mobile communication network at a reception time of the downlink data packets at the core network, wherein at a given load condition of the mobile communication network—such that a downlink data packet, incoming to the core network and being directed to the specific IP-address or to the specific range of IP-addresses of the user equipment, receives the alternative treatment by the core network—and in case of a particular downlink data packet—directed to the specific IP-address or to the specific range of IP-addresses of the user equipment—incoming to the core network, the particular downlink data packet is forwarded to the user equipment if at least one of the following conditions are met:

the filter element comprises an information that the user equipment is in the activated state, a preceding downlink data packet, preceding the particular downlink data packet in time and being directed to the specific IP-address or to the specific range of IP-addresses of the user equipment, has been forwarded to the user equipment, wherein the preceding downlink data packet precedes the particular downlink data packet by less than a predetermined first time interval, a preceding uplink data packet, preceding the particular downlink data packet in time and being originating from the specific IP-address or from the specific range of IP-addresses of the user equipment, has been received, by the filter element, from the user equipment, wherein the preceding uplink data packet precedes the particular downlink data packet by less than a predetermined second time interval.

According to the present invention it is thereby advantageously possible to enhance the level of quality of service experienced by a user of a user equipment, attached to the mobile communication network, without the need to heavily invest into an upgrade of the mobile communication network.

According to the present invention, the mobile communication network comprises an access network and a core network with the access network comprising a plurality of radio cells and a plurality of base station entities. At least one base station entity serves a user equipment, the user equipment being represented by a specific IP-address or a specific range of IP-addresses (PDN address). Presently and according to standardized procedures within mobile communication networks, the state of activation or of activity of a given user equipment is not systematically known within the core network of the telecommunications network.

Furthermore according to the present invention, the core network comprises a filter element such that the filter element either provides a forwarding functionality to the user equipment (of downlink data packets directed to the specific IP-address or to the specific range of IP-addresses of the user equipment) or provides an alternative treatment functionality (of downlink data packets directed to the specific IP-address or to the specific range of IP-addresses of the user equipment), wherein the application of the forwarding versus the alternative treatment functionality of the filter element is dependent on load conditions of the mobile communication network at reception time of the downlink data packets.

Assuming—for a given network architecture or given network structures, i.e. for a given network capacity within the mobile communication network in terms of performance indicators such as transmission bandwidth or the number of messages the network is able to process per second—that a downlink data packet received by the mobile communication network (from an outside network such as, e.g., the internet) would cause, in a worst case scenario, a certain maximum number of additional network messages (message amplification) of, say, 30 messages (in case, e.g., that the respective user equipment to which the downlink data packet is addressed is in idle mode at the reception time of the downlink data packet), then the requested handling of such a downlink data packet would need to be refused if the network load at the reception time of the downlink data packet is such that the handling of the downlink data packet together with the potential worst case message amplification cannot be guaranteed. In other words, at a given load condition of the mobile communication network, a downlink data packet, incoming to the core network and being directed to the specific IP-address or to the specific range of IP-addresses of the user equipment, receives the alternative treatment by the core network, i.e. is not forwarded to the user equipment (such a downlink data packet is typically either rejected or dropped or delayed).

According to the present invention, even though a network load situation applies that a downlink data packet (incoming to the mobile communication network) would not be transmitted to the addressed user equipment (as the handling of the maximum additional number of messages due to the effect of message amplification (of worst case scenario) would exceed the network handling capacity), another downlink data packet, directed to another user equipment (hereinafter called the particular downlink data packet) is actually forwarded to the respective user equipment if:

the filter element comprises an information that the user equipment is in the activated state (i.e. the explicit information is available to the filter element that a reduced number of additional messages applies such that the network load limits are not exceeded), a preceding downlink data packet, preceding the particular downlink data packet in time and being directed to the specific IP-address or to the specific range of IP-addresses of the user equipment, has been forwarded to the user equipment, wherein the preceding downlink data packet precedes the particular downlink data packet by less than a predetermined first time interval, a preceding uplink data packet, preceding the particular downlink data packet in time and being originating from the specific IP-address or from the specific range of IP-addresses of the user equipment, has been received, by the filter element, from the user equipment, wherein the preceding uplink data packet precedes the particular downlink data packet by less than a predetermined second time interval.

For example, in case that user equipments are in activated state, for downlink data packets addressed to such user equipments no significant internal (message) amplification will occur when no additional procedures such as paging procedures have to be executed in addition to the plain user packet transport. Thus such downlink data packet can be forwarded to the respective user equipments even though the network load is such that a transition of a user equipment (addressed by the downlink data packet) from idle state to an activated state including a paging procedure would exceed the network load.

According to the present invention, it is likewise possible and preferred that at the given load condition of the mobile communication network, a rate limit threshold is exceeded. This means that a general downlink data packet (i.e. a downlink data packet for which the worst case scenario of message accumulation could apply) would be refused if the rate limit threshold of the mobile communication network is exceeded.

Furthermore according to the present invention, it is preferred that providing an alternative treatment functionality of downlink data packets directed to the specific IP-address or to the specific range of IP-addresses of the user equipment corresponds to either
 rejecting or
 dropping or
 delaying
the downlink data packets. The alternative treatment in essence means that the downlink data packet is not forwarded to the user equipment.

It is furthermore preferred according to the present invention that at the given load condition of the mobile communication network and in case of the particular downlink data packet incoming to the core network, the particular downlink data packet is forwarded to the user equipment only if at least one of the following conditions are met:
 the filter element comprises an information that the user equipment is in the activated state,
 a preceding downlink data packet, preceding the particular downlink data packet in time and being directed to the specific IP-address or to the specific range of IP-addresses of the user equipment, has been forwarded to the user equipment, wherein the preceding downlink data packet precedes the particular downlink data packet by less than the predetermined first time interval,
 a preceding uplink data packet, preceding the particular downlink data packet in time and being originating from the specific IP-address or from the specific range of IP-addresses of the user equipment, has been received, by the filter element, from the user equipment, wherein the preceding uplink data packet precedes the particular downlink data packet by less than the further predetermined second time interval.

According to the present invention, it is furthermore preferred that the user equipment is able to be, besides the idle state and the activated state, in one further activated state, wherein the transition from idle state to the activated state requires more signaling procedures within the mobile communication network than the transition from idle state to the further activated state, wherein at a given further load condition of the mobile communication network a further particular downlink data packet, incoming to the core network and being directed to the specific IP-address or to the specific range of IP-addresses of the user equipment, is forwarded to the user equipment only if at least one of the following conditions are met:
 the filter element comprises an information that the user equipment is in the further activated state,
 a further preceding downlink data packet, preceding the further particular downlink data packet in time and being directed to the specific IP-address or to the specific range of IP-addresses of the user equipment, has been forwarded to the user equipment, wherein the further preceding downlink data packet precedes the further particular downlink data packet by less than a predetermined further first time interval, the predetermined further first time interval being longer than the predetermined first time interval,
 a further preceding uplink data packet, preceding the further particular downlink data packet in time and being originating from the specific IP-address or from the specific range of IP-addresses of the user equipment, has been received, by the filter element, from the user equipment, wherein the further preceding uplink data packet precedes the further particular downlink data packet by less than a predetermined further second time interval, the predetermined further second time interval being longer than the predetermined second time interval.

By using, besides the idle state and the activated state, also a further activated state of the user equipment, it is advantageously possible to apply a more fine granulated handling of downlink data packets incoming to the mobile communication network.

The present invention also relates to a telecommunications network for protecting the mobile communication network from performance impacts, wherein the mobile communication network comprises an access network and a core network, the access network comprising a plurality of radio cells and a plurality of base station entities, and the core network comprising a plurality of network nodes of the mobile communication network,
wherein a user equipment is located in a radio cell of the plurality of radio cells, the radio cell being served by a base station entity of the plurality of base station entities,
wherein the user equipment is able to be either in an idle state or in an activated state,
wherein the mobile communication network is configured to transmit downlink data packets from the mobile communication network to the user equipment as their destination, the downlink data packets being transported involving at least one network node of the core network and at least the base station entity,
wherein the mobile communication network is configured to transmit uplink data packets from the user equipment as their source to the mobile communication network, the uplink data packets being transported involving at least the base station entity and at least one network node of the core network,
wherein the user equipment—as the destination of the downlink data packet and as the source of the uplink data packets—is represented by a specific IP-address or a specific range of IP-addresses,
wherein the core network comprises a filter element, the filter element being configured such that it provides
 either a forwarding functionality, to the user equipment, of downlink data packets directed to the specific IP-address or to the specific range of IP-addresses of the user equipment,
 or an alternative treatment functionality of downlink data packets directed to the specific IP-address or to the specific range of IP-addresses of the user equipment,
the application of the forwarding versus the alternative treatment functionality of the filter element being dependent on load conditions of the mobile communication network at a reception time of the downlink data packets at the core network, wherein the mobile communication network is configured such that at a given load condition of the mobile communication network—such that a downlink data packet, incoming to the core network and being directed to the specific IP-address or to the specific range of IP-addresses of the user equipment, receives the alternative treatment by the core network —, and in case of a particular downlink data packet—directed to the specific IP-address or to the specific range of IP-addresses of the user equipment—incoming to the core network, the particular downlink data packet is forwarded to the user equipment if at least one of the following conditions are met:

the filter element comprises an information that the user equipment is in the activated state, a preceding downlink data packet, preceding the particular downlink data packet in time and being directed to the specific IP-address or to the specific range of IP-addresses of the user equipment, has been forwarded to the user equipment, wherein the preceding downlink data packet precedes the particular downlink data packet by less than a predetermined first time interval, a preceding uplink data packet, preceding the particular downlink data packet in time and being originating from the specific IP-address or from the specific range of IP-addresses of the user equipment, has been received, by the filter element, from the user equipment, wherein the preceding uplink data packet precedes the particular downlink data packet by less than a predetermined second time interval.

According to the present invention it is thereby advantageously possible to enable a more protected mode of using a mobile communication network at the same time as enhancing the efficiency of the mobile communication network. Likewise, the other above mentioned advantages of the inventive method apply—mutatis mutandis—also to the inventive telecommunications network.

According to the present invention—also with respect to the telecommunications network—it is preferred that at the given load condition of the mobile communication network, a rate limit threshold is exceeded.

Furthermore according to the present invention—also with respect to the telecommunications network—it is preferred that the alternative treatment functionality of downlink data packets directed to the specific IP-address or to the specific range of IP-addresses of the user equipment corresponds to either rejecting or dropping or delaying the downlink data packets.

Additionally—also with respect to the telecommunications network—it is preferred that at the given load condition of the mobile communication network and in case of the particular downlink data packet incoming to the core network, the particular downlink data packet is forwarded to the user equipment only if at least one of the following conditions are met:

the filter element comprises an information that the user equipment is in the activated state, a preceding downlink data packet, preceding the particular downlink data packet in time and being directed to the specific IP-address or to the specific range of IP-addresses of the user equipment, has been forwarded to the user equipment, wherein the preceding downlink data packet precedes the particular downlink data packet by less than the predetermined first time interval, a preceding uplink data packet, preceding the particular downlink data packet in time and being originating from the specific IP-address or from the specific range of IP-addresses of the user equipment, has been received, by the filter element, from the user equipment, wherein the preceding uplink data packet precedes the particular downlink data packet by less than the further predetermined second time interval.

Furthermore, the present invention relates to a filter element for protecting a mobile communication network from performance impacts, wherein the mobile communication network comprises an access network and a core network, the access network comprising a plurality of radio cells and a plurality of base station entities, and the core network comprising a plurality of network nodes of the mobile communication network, wherein a user equipment is located in a radio cell of the plurality of radio cells, the radio cell being served by a base station entity of the plurality of base station entities, wherein the user equipment is able to be either in an idle state or in an activated state, wherein the mobile communication network is configured to transmit downlink data packets from the mobile communication network to the user equipment as their destination, the downlink data packets being transported involving at least one network node of the core network and at least the base station entity, wherein the mobile communication network is configured to transmit uplink data packets from the user equipment as their source to the mobile communication network, the uplink data packets being transported involving at least the base station entity and at least one network node of the core network, wherein the user equipment—as the destination of the downlink data packet and as the source of the uplink data packets—is represented by a specific IP-address or a specific range of IP-addresses, wherein the core network comprises the filter element, the filter element being configured such that it provides either a forwarding functionality, to the user equipment, of downlink data packets directed to the specific IP-address or to the specific range of IP-addresses of the user equipment, or an alternative treatment functionality of downlink data packets directed to the specific IP-address or to the specific range of IP-addresses of the user equipment, the application of the forwarding versus the alternative treatment functionality of the filter element being dependent on load conditions of the mobile communication network at a reception time of the downlink data packets at the core network, wherein the filter element is configured such that at a given load condition of the mobile communication network—such that a downlink data packet, incoming to the core network and being directed to the specific IP-address or to the specific range of IP-addresses of the user equipment, receives the alternative treatment by the core network —, and in case of a particular downlink data packet—directed to the specific IP-address or to the specific range of IP-addresses of the user equipment—incoming to the core network, the particular downlink data packet is forwarded to the user equipment if at least one of the following conditions are met:

the filter element comprises an information that the user equipment is in the activated state, a preceding downlink data packet, preceding the particular downlink data packet in time and being directed to the specific IP-address or to the specific range of IP-addresses of the user equipment, has been forwarded to the user equipment, wherein the preceding downlink data packet precedes the particular downlink data packet by less than a predetermined first time interval, a preceding uplink data packet, preceding the particular downlink data packet in time and being originating from the specific IP-address or from the specific range of IP-addresses of the user equipment, has been received, by the filter element, from the user equipment, wherein the preceding uplink data packet precedes the particular downlink data packet by less than a predetermined second time interval.

According to the present invention it is thereby advantageously possible to enable a more protected mode of using a mobile communication network at the same time as enhancing the efficiency of the mobile communication network. Likewise, the other above mentioned advantages of the inventive method and of the inventive telecommunications network apply—mutatis mutandis—also to the inventive filter element.

Furthermore, the present invention relates to a program comprising a computer readable program code which, when executed on a computer and/or on a network node of a mobile communication network, especially a filter element of a mobile communication network, causes the computer and/or the network node of the mobile communication network to perform the inventive method.

The present invention also relates to computer program product for using a core network of a telecommunications network, the computer program product comprising a computer program stored on a storage medium, the computer program comprising program code which, when executed on a computer and/or on a network node of a mobile communication network, especially a filter element of a mobile communication network, causes the computer and/or the network node of the mobile communication network to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100 (or public land mobile network) is schematically shown, wherein the mobile communication network 100 comprises an access network 110 and a core network 120. The access network 110 typically comprises a plurality of base stations (or base station entities). Only one base station entity 111 of such a plurality of base station entities (or base stations) is schematically represented in FIG. 1, together with a corresponding radio cell 11. Typically, such a mobile communication network 100 comprises a plurality of user equipments or mobile devices, only one user equipment (or mobile device) 20 is schematically represented in FIG. 1. Such a telecommunications network 100 is typically used to provide mobile communication services to the user equipments or mobile devices 20 connected to or attached to the mobile communication network 100.

Figure 2:
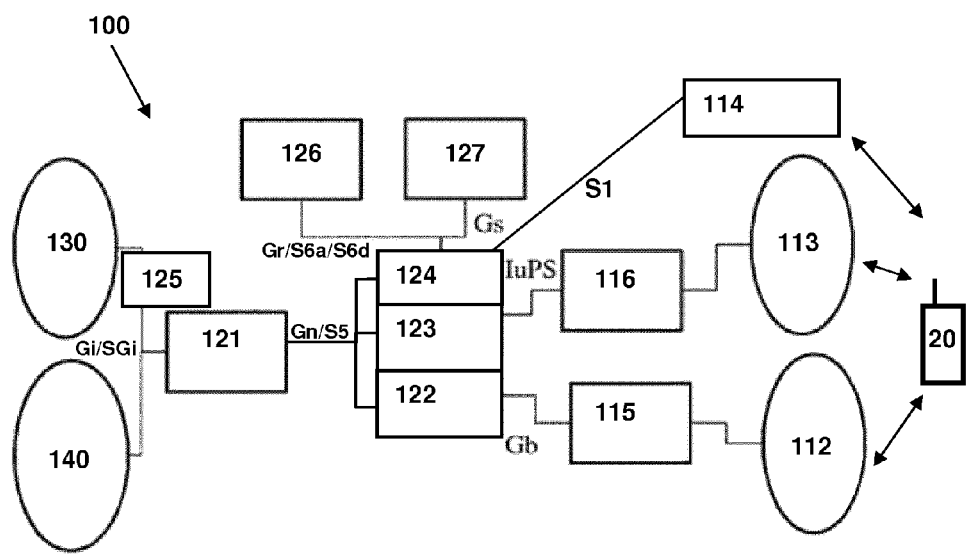
FIG. 2 schematically illustrates a block diagram implementing the inventive method and comprising the inventive filter element used by the inventive mobile communication network.

In FIG. 2, a block diagram showing or implementing the inventive method and comprising the inventive filter element used by the inventive mobile communication network 100 is schematically shown. The mobile communication network 100 typically allows the user equipment (or mobile device) 20 to communicate, using one or a plurality of air interfaces, with different layers or according to different radio access technologies with the mobile communication network 100, such as according to the GSM standard (Global System for Mobile telecommunication), the UMTS standard (Universal Mobile Telecommunications System) and/or the LTE standard (Long Term Evolution). Therefore, the mobile communication network 100 typically comprises—as part of the access network 110—a GSM (Global System for Mobile telecommunication) radio network (BSS, Base Station Subsystem) 112, a UMTS (Universal Mobile Telecommunications System) radio network (RAN, radio access network) 113, and an LTE (Long Term Evolution) radio network 114. The GSM radio network (BSS) 112 is typically connected to a Base Station Controller (BSC) 115. The UMTS radio network (RAN) 113 is typically connected to a Radio Network Controller (RNC) 116.

Additional (data packet enabled) layers or standards or radio access technologies can also be realized in the mobile communication network 100.

According to the present invention, the mobile communication network 100 typically additionally comprises—as part of the core network 120—one or a plurality of SGSNs (Serving GPRS (General Packet Radio System) Support Nodes) as well as one or a plurality of GGSNs (Gateway GPRS Support Nodes).

A node providing a GGSN functionality and/or a Packet Data Network (PDN) Gateway functionality is represented by reference sign 121 in FIG. 2. The gateway GPRS support node (GGSN) is a main component of the GPRS network. The GGSN/PDN Gateway is responsible for the internetworking between the GPRS network and external packet switched networks, like the Internet 130 and company networks 140, being typically Internet Protocol networks or other Packet Data Networks, typically via a Gi/SGi interface. The GGSN/PDN Gateway enables the mobility of the user equipment 20 in the mobile communication network 100, and, especially, is responsible for IP address assignment for the user equipment 20.

The GSM radio network 112 and/or the Base Station Controller 115 is connected, via a Gb interface, to a first SGSN (Serving GPRS (General Packet Radio System) Support Node) 122. The UMTS radio network 113 and/or the Radio Network Controller 116 is connected, via an IuPS interface, to a first SGSN (Serving GPRS (General Packet Radio System) Support Node) 123. The LTE radio network 114 is connected to a Mobility Management Entity 124, wherein the network node designated by reference sign 124 typically comprises the functionality of the Mobility Management Entity and of a Serving Gateway.

The core network 120 typically also comprises a node providing a HLR (Home Location Register) and/or a HSS (Home Subscriber Server) functionality 126 (using a Gr/S6a/S6d interface in its communication with the first and/or second SGSN 122 123 and/or the Mobility Management Entity/Serving Gateway 124), as well as one node or a plurality of nodes providing an MSC (Mobile Switching Center) functionality 127 (using a Gs interface in its communication with the first and/or second SGSN 122 123). The GGSN/PDN Gateway 121 and the first and/or second SGSN 122, 123 and/or Mobility Management Entity/Serving Gateway 124 communicate using a Gn/S5 interface.

According to the present invention, performance impacts of the mobile communication network 100 are avoided by treating downlink data packets—incoming via the internet 130 or via a company network 140 to the GGSN/PDN Gateway node 121—differently in dependence of especially the supposed state of activity of the user equipment 20 addressed by the downlink data packets. This treatment is performed by a filter element 125

For the sake of simplicity, if it is assumed that the user equipment 20 is able to be in either in an idle state or in an activated state (i.e. in a state that could be characterized as being "less active" ("idle state") and in a state that could be characterized as being "more active" ("activated state")), and wherein downlink data packets being transmitted from the mobile communication network 100 to the user equipment 20 as their destination, the downlink data packets typically being transported involving at least one network node of the core network 120 and at least the base station entity 111. For the GGSN/PDN Gateway unit or GGSN/PDN Gateway node 121, the user equipment 20, as the destination of the downlink data packet, is represented by a specific IP-address or a specific range of IP-addresses.

The filter element 125 provides either a forwarding functionality, to the user equipment 20, of downlink data packets directed to the specific IP-address or to the specific range of IP-addresses of the user equipment 20, or an alternative treatment functionality of downlink data packets directed to the specific IP-address or to the specific range of IP-addresses of the user equipment 20.

The alternative treatment functionality of downlink data packets directed to the specific IP-address or to the specific range of IP-addresses of the user equipment 20 corresponds either to reject or to drop or to delay the downlink data packets.

Based on the functionality of the filter element 125, according to the present invention, it is preferred to locate the filter element 125 rather upstream with regard to the handling of downlink data packets, i.e. typically at or even at the input side of the GGSN/PDN Gateway node 121, i.e. at the first node that such downlink data packets have to pass upon entering the mobile communication network 100. However, it is also possible and preferred to locate the filter element 125 at another location within the mobile communication network 100, e.g., between the GGSN/PDN Gateway 121 and the respective SGSN 122, 123 responsible for the user equipment 20.

The application of the forwarding versus the alternative treatment functionality of the filter element 125 is dependent on load conditions of the mobile communication network 100 at a reception time of the downlink data packets at the core network 120. For a given downlink data packet that is incoming to the mobile communication network 100, it has to be assumed that a certain additional network load is caused by or associated with the new incoming downlink data packet. Typically it is to be assumed an increased additional network load if the user equipment 20 is in a less activated state (such as the idle state) as compared to the additional network load (caused by or associated with the newly arriving or incoming downlink data packet) if the user equipment 20 is in a more activated state (such as the "activated state").

According to the present invention, in case that the load conditions of the mobile communication network 100 (or of the core network 120) are such that a downlink data packet, incoming to the core network 120 and being directed to the user equipment 20 (i.e. to the specific IP-address or to the specific range of IP-addresses of the user equipment 20), receives (due to network overload or due to not having the appropriate additional handling capacity for the newly incoming downlink data packet) the alternative treatment (by the core network 120 or by the filter element 125), a particular downlink data packet—incoming to the core network 120 and directed to the specific IP-address or to the specific range of IP-addresses of the user equipment 20—is forwarded to the user equipment 20 if one or a plurality of conditions are met, whereas an arbitrary downlink data packet directed to the user equipment 20 is not forwarded (i.e. the alternative treatment applied).

According to the present invention, the conditions to forward a particular downlink data packet (that should normally, i.e. in view of the load conditions, not be forwarded) comprise:

the filter element 125 having an information (or having access to an information) that the user equipment 20 is in the activated state, a preceding downlink data packet, preceding the particular downlink data packet in time and being directed to the specific IP-address or to the specific range of IP-addresses of the user equipment 20, has been forwarded to the user equipment 20, wherein the preceding downlink data packet precedes the particular downlink data packet by less than a predetermined first time interval, a preceding uplink data packet, preceding the particular downlink data packet in time and being originating from the specific IP-address or from the specific range of IP-addresses of the user equipment 20, has been received, by the filter element 125, from the user equipment 20, wherein the preceding uplink data packet precedes the particular downlink data packet by less than a predetermined second time interval.

In the same way as downlink data packets are directed to the user equipment 20 and the user equipment 20 is represented by a specific IP-address or a specific range of IP-addresses, uplink data packets are transmitted from the user equipment 20 as their source to the mobile communication network 100, the uplink data packets being transported involving at least the base station entity 111 and at least one network node of the core network 120. According to the present invention, the user equipment 20 is represented—and known by the GGSN/PDN Gateway 121—by a specific IP-address or a specific range of IP-addresses not only as the destination of the downlink data packet but also as the source of uplink data packets.

Until the expiration of the first time interval (after the last downlink data packet addressed to the user equipment 20) and after the expiration of the second time interval (after the last uplink data packet originating from the user equipment 20), it is reasonable to assume, for normal cases, that the user equipment 20 is still in an activated state such that a further incoming data packet (i.e. the particular downlink data packet) does not lead to severe message amplification and thus overload within the mobile communication network 100. I.e. based on the condition of the time elapsed since the last data packet associated with the user equipment 20 (in uplink or downlink direction), it is advantageously possible according to the present invention to allow forwarding of the particular downlink data packet even in cast that the mobile communication network 100 would have to reject this particular downlink data packet due to comparably high network load. This is related to the GGSN/PDN Gateway 121 (and globally the core network 120) normally not having explicit or direct knowledge about the precise activation state of the user equipment 20. According to the present invention, it is possible and preferred that the first time interval corresponds to the second time interval, especially in case that the user equipment 20 will move from the activated state to (or in the direction of) the idle state after expiration of the same time interval regardless of whether a data packet has been received or transmitted.

The invention also relates to the less simple case of the user equipment 20 not only having two possible states, but having at least three possible states, namely the idle state (or "least activated state"), the activated state, and an additional further activated state. According to the present invention, the further activated state corresponds to a state that is "less activated" than the activated state but, of course, more activated than the idle state. This is reflected in the transition from idle state to the activated state requires more signaling procedures within the mobile communication network 100 than the transition from idle state to the further activated state (i.e. there are less messages—or network load—required from the activated state of the user equipment 20 to the most activated state possible of the user equipment 20 (if the activated state corresponds to the most activated state of the user equipment 20, then this number of additionally required messages corresponds to zero) than from the further activated state of the user equipment 20 to the most activated state possible of the user equipment 20.

According to the present invention, in such a scenario of three possible states of the user equipment 20, the mobile communication network 100 behaves as follows: at a given further load condition of the mobile communication network 100 (the further load condition corresponding especially to a higher network load than the load condition), a further particular downlink data packet, incoming to the core network 120 and being directed to the specific IP-address or to the specific range of IP-addresses of the user equipment 20, is forwarded to the user equipment 20 only if at least one of the following conditions are met:

the filter element 125 comprises an information that the user equipment (20) is in the further activated state, a further preceding downlink data packet, preceding the further particular downlink data packet in time and being directed to the specific IP-address or to the specific range of IP-addresses of the user equipment 20, has been forwarded to the user equipment 20, wherein the further preceding downlink data packet precedes the further particular downlink data packet by less than a predetermined further first time interval, the predetermined further first time interval being longer than the predetermined first time interval, a further preceding uplink data packet, preceding the further particular downlink data packet in time and being originating from the specific IP-address or from the specific range of IP-addresses of the user equipment 20, has been received, by the filter element 125, from the user equipment 20, wherein the further preceding uplink data packet precedes the further particular downlink data packet by less than a predetermined further second time interval, the predetermined further second time interval being longer than the predetermined second time interval.

Until the expiration of the further first time interval (after the last downlink data packet addressed to the user equipment 20) and after the expiration of the further second time interval (after the last uplink data packet originating from the user equipment 20), it is reasonable to assume, for normal cases, that the user equipment 20 is still in at least the further activated state such that a further incoming data packet (i.e. the particular downlink data packet) might lead to a mild message amplification (probably more compared with the activated state) but does not lead to severe message amplification and thus overload within the mobile communication network 100. I.e. based on the condition of the time elapsed since the last data packet associated with the user equipment 20 (in uplink or downlink direction), it is advantageously possible according to the present invention to allow forwarding of the further particular downlink data packet even in cast that the mobile communication network 100 would have to reject this further particular downlink data packet due to comparably high network load (the further load condition normally corresponding to a higher network load than the load condition discussed above). This is related to the GGSN/PDN Gateway 121 (and globally the core network 120) normally not having explicit or direct knowledge about the precise activation state of the user equipment 20. According to the present invention, it is possible and preferred that the further first time interval corresponds to the further second time interval, especially in case that the user equipment 20 will move from the most activated state to the further activated state and from there to (or in the direction of) the idle state after expiration of the same time interval regardless of whether a data packet has been received or transmitted.

According to an example, the user equipment 20 is able to be in a (fully) activated state or in idle state. The activated state corresponds to the fully activated state, i.e. there is no message amplification upon reception, by the core network 120, of a downlink data packet directed to the user equipment 20 being in the activated state. The message amplification might cause 30 additional messages to be handled by the mobile communication network 100 if the user equipment 20 is in idle state. The transition time from the activated state to idle state might correspond to 30 seconds (of inactivity, i.e. without, at the user equipment 20, neither receiving nor transmitting data packets).

If the mobile communication network 100 is configured to be able to handle 30000 messages per second, and the current network load corresponds to more than 29970 messages per second (load condition), then incoming additional particular downlink data packets are forwarded (to the respective user equipments 20) only in case that the time condition is verified (or that explicit knowledge is available to the GGSN/PDN Gateway 121 (or the core network 120) that the user equipment 20 is indeed in activated state), i.e. within 30 seconds (first/second time interval) prior to the particular downlink data packet, there has been a preceding downlink data packet (or a preceding uplink data packet) associated to the user equipment 20.

According to another example, the user equipment 20 is able to be in a (fully) activated state, a (intermediately activated) further activated state, or in idle state. The activated state corresponds to the fully activated state, i.e. there is no message amplification upon reception, by the core network 120, of a downlink data packet directed to the user equipment 20 being in the activated state. The message amplification might be 10 additional messages if the user equipment 20 is in the further activated state, and 30 additional messages to be handled by the mobile communication network 100 if the user equipment 20 is in idle state. The transition time from activated state to the further activated state might correspond to 10 seconds (of inactivity, i.e. without, at the user equipment 20, neither receiving nor transmitting data packets). The transition time from the further activated state to idle state might correspond to an additional 20 seconds (of inactivity, i.e. without, at the user equipment 20, neither receiving nor transmitting data packets).

If the mobile communication network 100 is configured to being able to handle 30000 messages per second, and the current network load corresponds to more than 29970 messages per second (but not more than 2990 messages per second), then incoming additional particular downlink data packets are forwarded (to the respective user equipments 20) only in case that the time condition is verified (or that explicit knowledge is available to the GGSN/PDN Gateway 121 (or the core network 120) that the user equipment 20 is indeed in activated state or further activated state), i.e. within 30 second prior to the particular downlink data packet, there has been a preceding downlink data packet (or a preceding uplink data packet) associated to the user equipment 20. If the current network load corresponds to more than 29990 messages per second (further load condition), then incoming additional (further) particular downlink data packets are forwarded (to the respective user equipments 20) only in case that the time condition is verified (or that explicit knowledge is available to the GGSN/PDN Gateway 121 (or the core network 120) that the user equipment 20 is indeed in activated (and not only in the further activated state), i.e. within 10 second prior to the (further) particular downlink data packet, there has been a preceding downlink data packet (or a preceding uplink data packet) associated to the user equipment 20.

According to the present invention, the time since the last (or preceding) uplink data packets (from the user equipment 20) or since the last (or preceding) downlink data packet (to the user equipment 20) is taken as the common criterion that helps to decide whether an incoming packet to be delivered to a user equipment (or mobile device) 20 will require to change its state: if a device has sent or received packets recently (i.e. within the time window of the first/second time interval or of the further first/further second time interval), it is in an activated state or at least in a further activated state. If this is not the case (i.e. there has been no traffic to deliver or receive within the time windows), the device has changed to an even less activated state (or even to idle state) after some time period of inactivity.

If the device has not sent or received packets recently, it must change its state. Any change between an "active" state and "idle" state will cause a complex procedure. Therefore, transmitting a downlink data packet to an "active" user equipment 20 is simple for the mobile communication network 100, but transmitting a packet to a user equipment 20 currently in idle state will cause the problematic message amplification because the user equipment 20 must be brought into the activated state. In reality, there are further activated states in different layers, and changes between them, with a different degree of amplification, but according to the inventive method, a good estimation—compared to existing filter solutions—can be used for one or more activation states of user equipments 20.

According to an alternative method of the present invention, mobile devices or user equipments 20 are represented by their IP address (PDN address), out of an address pool A which has been allocated by the mobile network for mobile devices. The filter (or filter element 125) is inserted between the mobile network and the Internet, or any other packet data network, PDN), so that the filter element 125 has access to the addresses of the mobile devices both in incoming (downlink) and outgoing (uplink) data packets. Initially, all mobile devices related to addresses from pool A are considered to be in "idle" state. Mobile network operator determines a time threshold TT1 (first/second time interval), after which a device will switch from "active" to "idle" state if it did not receive or transmit user plane packets. When the filter element 125 sees traffic passing by, from or towards a specific address AA out of address pool A, it stores this address in a table B to indicate that the user equipment 20 related to this address is considered "active", resets a timer T1(AA) to zero, and starts the timer. When timer T1(AA) reaches the threshold TT1, address AA is removed from table B, and the device related to this address is considered to be "idle" again. The filter device applies different traffic rate limits for traffic incoming from the Internet, dependent on whether the target address is in table B or not:

A very low packet rate limit can be set for targets in not in table A, to protect the network against overload, e.g. according to the signalling processing limits in the network.

If the target is in table B, the rate limit can be omitted, or set higher, according to other criteria, e.g. the user data rate granted to the mobile device.

Additional thresholds TT2, TT3, . . . and tables C, D, . . . can be used in order to model different states with different amplification potential and different rate limits While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for protecting a mobile communication network from performance impacts, wherein the mobile communication network comprises an access network and a core network, the access network comprising a plurality of radio cells and a plurality of base station entities, and the core network comprising a plurality of network nodes of the mobile communication network, wherein a user equipment is located in a radio cell of the plurality of radio cells, the radio cell being served by a base station entity of the plurality of base station entities, wherein the user equipment is able to be either in an idle state or in an activated state, wherein the user equipment is represented by a specific IP-address or a specific range of IP-addresses, wherein the core network comprises a filter element, wherein the method comprises:
  determining, by the filter element, whether to apply a forwarding functionality or an alternative treatment functionality for downlink data packets directed to the specific IP-address or to the specific range of IP-addresses of the user equipment, wherein the application of the forwarding functionality versus the alternative treatment functionality of the filter element is based on load conditions of the mobile communication network at a reception time of the downlink data packets at the core network; and
  providing the forwarding functionality or the alternative treatment functionality for the downlink data packets directed to the specific IP-address or to the specific range of IP-addresses of the user equipment;
  wherein at a given load condition of the mobile communication network, the forwarding functionality is applied for a particular downlink data packet if at least one of the following conditions are met:
    the filter element comprises information that the user equipment is in the activated state;
    a preceding downlink data packet, preceding the particular downlink data packet in time and being directed to the specific IP-address or to the specific range of IP-addresses of the user equipment, has been forwarded to the user equipment, wherein the preceding downlink data packet precedes the particular downlink data packet by less than a predetermined first time interval;
    a preceding uplink data packet, preceding the particular downlink data packet in time and originating from the specific IP-address or from the specific range of IP-addresses of the user equipment, has been received, by the filter element, from the user equipment, wherein the preceding uplink data packet precedes the particular downlink data packet by less than a predetermined second time interval; and
  wherein at the given load condition of the mobile communication network, the alternative treatment functionality is applied for a particular downlink data packet if none of the foregoing conditions are met.

2. The method according to claim 1, wherein at the given load condition of the mobile communication network, a rate limit threshold is exceeded.

3. The method according to claim 1, wherein providing the alternative treatment functionality corresponds to rejecting or dropping or delaying the downlink data packets.

4. The method according to claim 1, wherein the user equipment is able to be, besides the idle state and the activated state, in one further activated state, wherein the transition from idle state to the activated state requires more signaling procedures within the mobile communication network than the transition from idle state to the further activated state;
  wherein at the given further load condition of the mobile communication network, a further particular downlink data packet directed to the specific IP-address or to the specific range of IP-addresses of the user equipment is forwarded to the user equipment only if at least one of the following conditions are met:
    the filter element comprises an information that the user equipment is in the further activated state,
    a further preceding downlink data packet, preceding the further particular downlink data packet in time and being directed to the specific IP-address or to the specific range of IP-addresses of the user equipment, has been forwarded to the user equipment, wherein the further preceding downlink data packet precedes the further particular downlink data packet by less than a predetermined further first time interval, the predetermined further first time interval being longer than the predetermined first time interval,
    a further preceding uplink data packet, preceding the further particular downlink data packet in time and originating from the specific IP-address or from the specific range of IP-addresses of the user equipment, has been received, by the filter element, from the user equipment, wherein the further preceding uplink data packet precedes the further particular downlink data packet by less than a predetermined further second time interval, the predetermined further second time interval being longer than the predetermined second time interval.

5. A mobile communication network protected from performance impacts, wherein the mobile communication network comprises:
  an access network; and
  a core network;
  wherein the access network comprises a plurality of radio cells and a plurality of base station entities, wherein a user equipment is located in a radio cell of the plurality of radio cells, the radio cell being served by a base station entity of the plurality of base station entities;
  wherein the core network comprises a plurality of network nodes of the mobile communication network;
  wherein the user equipment is able to be either in an idle state or in an activated state;
  wherein the user equipment is represented by a specific IP-address or a specific range of IP-addresses;
  wherein the core network comprises a filter element, the filter element is configured to:
    determine whether to apply a forwarding functionality or an alternative treatment functionality for downlink data packets directed to the specific IP-address or to the specific range of IP-addresses of the user equipment, wherein the application of the forwarding functionality versus the alternative treatment functionality of the filter element is based on load conditions of the mobile communication network at a reception time of the downlink data packets at the core network; and
    provide the forwarding functionality or the alternative treatment functionality for the downlink data packets directed to the specific IP-address or to the specific range of IP-addresses of the user equipment;
  wherein at a given load condition of the mobile communication network, the forwarding functionality is applied for a particular downlink data packet if at least one of the following conditions are met:

the filter element comprises information that the user equipment is in the activated state, a preceding downlink data packet, preceding the particular downlink data packet in time and being directed to the specific IP-address or to the specific range of IP-addresses of the user equipment, has been forwarded to the user equipment, wherein the preceding downlink data packet precedes the particular downlink data packet by less than a predetermined first time interval, a preceding uplink data packet, preceding the particular downlink data packet in time and originating from the specific IP-address or from the specific range of IP-addresses of the user equipment, has been received, by the filter element, from the user equipment, wherein the preceding uplink data packet precedes the particular downlink data packet by less than a predetermined second time interval; and wherein at the given load condition of the mobile communication network, the alternative treatment functionality is applied for a particular downlink data packet if none of the foregoing conditions are met.

6. A non-transitory computer-readable medium having processor-executable instructions stored thereon for protecting a mobile communication network from performance impacts, wherein the mobile communication network comprises an access network and a core network, the access network comprising a plurality of radio cells and a plurality of base station entities, and the core network comprising a plurality of network nodes of the mobile communication network, wherein a user equipment is located in a radio cell of the plurality of radio cells, the radio cell being served by a base station entity of the plurality of base station entities, wherein the user equipment is able to be either in an idle state or in an activated state, wherein the user equipment is represented by a specific IP-address or a specific range of IP-addresses, wherein the core network comprises a filter element, wherein the processor-executable instructions, when executed, facilitate performance of the following:

determining, by the filter element, whether to apply a forwarding functionality or an alternative treatment functionality for downlink data packets directed to the specific IP-address or to the specific range of IP-addresses of the user equipment, wherein the application of the forwarding functionality versus the alternative treatment functionality of the filter element is based on load conditions of the mobile communication network at a reception time of the downlink data packets at the core network; and providing the forwarding functionality or the alternative treatment functionality for the downlink data packets directed to the specific IP-address or to the specific range of IP-addresses of the user equipment;

wherein at a given load condition of the mobile communication network, the forwarding functionality is applied for a particular downlink data packet if at least one of the following conditions are met:

the filter element comprises information that the user equipment is in the activated state;

a preceding downlink data packet, preceding the particular downlink data packet in time and being directed to the specific IP-address or to the specific range of IP-addresses of the user equipment, has been forwarded to the user equipment, wherein the preceding downlink data packet precedes the particular downlink data packet by less than a predetermined first time interval, a preceding uplink data packet, preceding the particular downlink data packet in time and originating from the specific IP-address or from the specific range of IP-addresses of the user equipment, has been received, by the filter element, from the user equipment, wherein the preceding uplink data packet precedes the particular downlink data packet by less than a predetermined second time interval; and wherein at the given load condition of the mobile communication network, the alternative treatment functionality is applied for a particular downlink data packet if none of the foregoing conditions are met.

* * * * *